Patented Feb. 6, 1923.

1,444,430

UNITED STATES PATENT OFFICE.

MAX Y. SEATON, OF MIDLAND, MICHIGAN, ASSIGNOR TO THE DOW CHEMICAL COMPANY, OF MIDLAND, MICHIGAN, A CORPORATION OF MICHIGAN.

INSECTICIDAL COMPOUND.

No Drawing. Application filed September 12, 1919. Serial No. 323,327.

*To all whom it may concern:*

Be it known that I, MAX Y. SEATON, a citizen of the United States, and a resident of Midland, county of Midland, and State of Michigan, have invented a new and useful Improvement in Insecticidal Compounds, of which the following is a specification, the principle of the invention being herein explained and the best mode in which I have contemplated applying that principle, so as to distinguish it from other inventions.

It has been recently found that magnesium arsenate, when properly made, constitutes an insecticide of great practical value and one that bids fair to replace the familiar lead arsenate in all the various fields in which the latter has been so extensively employed since its original introduction in this country in order to combat the gypsy moth. As in the case of such lead arsenate, so this magnesium arsenate is preferably marketed in dry or powdered form, and, despite its lower specific gravity, a similar tendency is exhibited for the powdered product to agglomerate or collect in flocks when admixed with water or other liquid vehicle, as is the regular practice in spraying operations wherein these insecticides are employed.

The object of the present invention is to overcome the tendency in the case of magnesium arsenate for the particles to group into aggregates of larger size, and to maintain the material in the mixture in a highly disseminated condition which renders it extremely slow settling. At the same time superior spreading and adhesive qualities are obtained when the product is applied to plants and foliage.

To the accomplishment of the foregoing and related objects, the invention, then, consists of the novel composition of matter herein described, it being understood, however, as to the ingredients employed in such composition, that changes may be made therein without departing from the spirit of the invention.

The megnesium arsenate employed may be either the di-magnesium ortho-arsenate ($MgHAsO_4$), which is also known as the acid arsenate of magnesium, or the neutral arsenate, since these when properly prepared and applied, appear to have the highest insecticidal value. Such arsenate is formed as a very finely divided flocculent precipitate, which settles relatively slowly. The separation of such precipitate may be accomplished by centrifuge or filter press, and the cake, with as much water extracted therefrom as possible, thereupon dried, after which the material is reduced to a powder in any suitable form of mill or pulverizing machine.

As indicated, however, when this powder is admixed with a vehicle such as water for example, the particles evince a tendency to group into aggregates of larger size, and these aggregates settle relatively rapidly, thus making it difficult to secure an even distribution of the spray mixture. In an endeavor to overcome this difficulty, I have found that such grouping or coagulation can be prevented, and the colloidal condition of the material maintained in such mixture by the addition of a substance which in itself forms a colloidal solution in water of the emulsoid type. As typical of such substance, I have found soluble casein, e. g. the sodium salt of casein, entirely satisfactory; also gelatin; both of these being protective colloids of high efficiency, so that only a very small quantity of such substance is required, four per cent. by weight (dry) of such soluble casein serving the purpose admirably.

When regarded under the microscope, a properly dilute mixture of magnesium arsenate in water, with such substance added, exhibits a strikingly different appearance from a mixture of the same without such additional substance; in other words, the particles apparently tend to separate, and remain in separated condition, instead of to agglomerate or collect in flocks. The result is a mixture that is of extremely slow settling quality; in fact, so far as its practical use is concerned, no settling of consequence whatever occurs. Furthermore, when applied to foliage, not only does the mixture spread more uniformly and evenly over the same, but the particles of arsenate are maintained in uniformly distributed condition, while at the same time the casein or equivalent substance increases the adherence of the mixture both in the wet and in the dry state, i. e. after the water has evaporated.

The casein, or equivalent deflocculating agent, is preferably added in dry form to the dried magnesium arsenate, either previously to the pulverizing of the latter or subsequently thereto. In the latter case, the added substance must itself of course be finely ground or pulverized before it is thus added.

Other modes of applying the principle of my invention may be employed instead of the one explained, change being made as regards the composition and method herein disclosed, provided the ingredients stated by any of the following claims or the equivalent of such stated ingredients be employed.

I therefore particularly point out and distinctly claim as my invention:—

1. A composition of matter for insecticidal use comprising magnesium arsenate and a relatively small quantity of a suitable deflocculating agent, said composition being readily suspendable in water for spraying and for improving the spreading and covering qualities when thus applied, and forming an adherent dry film resistant to the erosive action of water.

2. A composition of matter for insecticidal use comprising magnesium arsenate and a relatively small quantity of a substance which forms collodial solutions of the emulsoid type in water.

3. A composition of matter for insecticidal use comprising magnesium arsenate and a relatively small quantity of a soluble casein compound.

4. A composition of matter for insecticidal use comprising magnesium arsenate and approximately four per cent by weight of an alkali metal salt of casein.

5. A composition of matter for insecticidal use comprising magnesium arsenate and a relatively small quantity of a suitable deflocculating agent, both ingredients being dry and finely pulverized, and the mixture thereof being readily suspendable in water for spraying and for improving the spreading and covering qualities when thus applied, and forming an adherent dry film resistant to the erosive action of water.

6. A composition of matter for insecticidal use comprising magnesium arsenate and a relatively small quantity of a casein compound, both ingredients being dry and finely pulverized.

7. A composition of matter for insecticidal use comprising magnesium arsenate and approximately four per cent by weight of an alkali metal salt of casein, both ingredients being dry and finely pulverized.

Signed by me, this 6th day of Sept., 1919.

MAX Y. SEATON.